H. A. RIDEOUT.
Device for Kneading Dough and Working Butter.

No. 218,578.    Patented Aug. 12, 1879.

Witnesses:
C. Clarence Poole
R. N. Dyer

Inventor
Henry A. Rideout
by Geo. W. Dyer & Co.
Attys

UNITED STATES PATENT OFFICE.

HENRY A. RIDEOUT, OF CALAIS, MAINE, ASSIGNOR TO OLIVER B. RIDEOUT AND MARTHA P. RIDEOUT, OF SAME PLACE, ONE-THIRD TO EACH.

IMPROVEMENT IN DEVICES FOR KNEADING DOUGH AND WORKING BUTTER.

Specification forming part of Letters Patent No. 218,578, dated August 12, 1879; application filed January 13, 1879.

*To all whom it may concern:*

Be it known that I, HENRY A. RIDEOUT, of Calais, in the county of Washington and State of Maine, have invented a new and useful Improvement in Devices for Kneading Dough and Working Butter; and I do hereby declare that the following is a full and exact description of the same, reference being had to the accompanying drawings, and to the letters of reference marked thereon.

The object I have in view is to produce a simple and cheap device, more especially designed for farmers' use, which can be used either for kneading bread, or for working butter, or for rolling out dough for biscuits, or for cutting biscuits, and printing butter, and will be very convenient and efficient when used for any of these purposes; and my invention therein consists, principally, in the combination of the devices for working the dough or butter irrespective of the construction of the receptacle upon or in which the dough or butter is placed; further, in the combination of such parts with a turn-table, upon which the dough or butter is worked.

Figure 1:
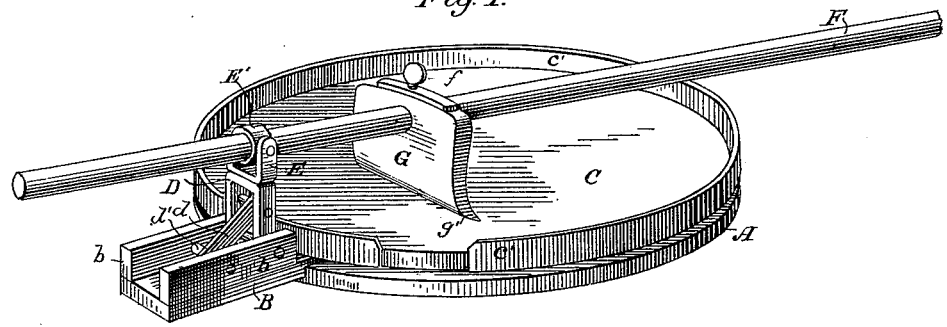
Figure 2:
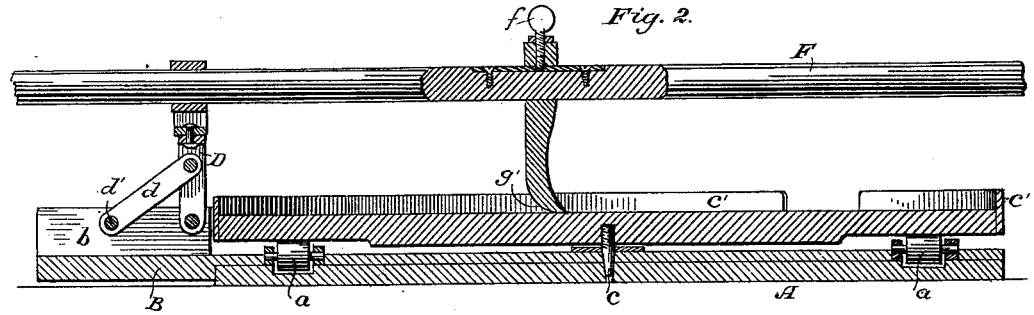
Figure 3:
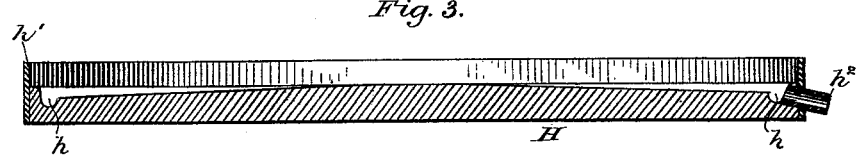
Figure 4:
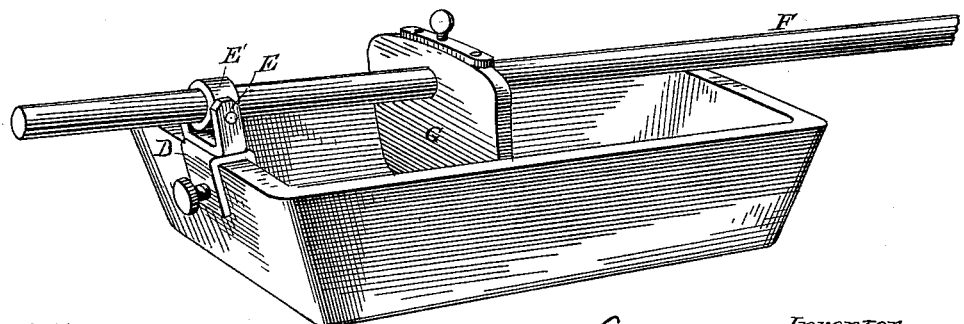

In the drawings, Figure 1 is a perspective view of the parts arranged as a bread-kneader; Fig. 2, a central section of the same; Fig. 3, a sectional view of the butter-working board; Fig. 4, a view of a tray with the butter-working devices attached.

Like letters denote corresponding parts.

A represents a circular board, upon the top of which are placed three or more anti-friction rollers, $a$. Extending centrally across the upper side of the board A is a strip, B, secured to the board, so as to strengthen the same, and projecting at one end a short distance beyond the edge of the circular board. This extended end of the strip has side pieces $b$, which, with the strip, form a handle to carry the device, and a support for the standard through which the operating-lever passes, as will be presently explained. This projecting strip may be made in one piece with the circular board A; but the form shown is preferred for strength.

Above the board A and resting on the rollers $a$ is placed the circular turn-table C, which is pivoted to the board A by a central pin or bolt, $c$, preferably secured by a cross-pin or a nut at its lower end, so as to be removable; but it may be permanently secured.

The table may have an upward rim, $c'$, around its edge, which would be cut away at one point, as shown. This turn-table will, as thus constructed, take the place of the ordinary breadboard, will be made of the right size to serve as a cover for a flour-barrel, and can be readily carried by its handle.

D is a standard, made of metal, in the form of an inverted U, and pivoted by a cross-pin between the sides $b$ of the handle close to the turn-table. It has a pivoted brace, $d$, projecting outwardly, and secured by a removable pin, $d'$, passing through the sides $b$.

When the device is not in use for working either butter or dough, by removing the pin $d'$ the standard can be turned down out of the way between the sides $b$, and held in that position by pushing the pin through the said sides over the standard.

Pivoted to the top of the standard D is a U-shaped swivel, E, and in this swivel is horizontally pivoted a metal ring, $E'$. F is a round hand rod or lever, of sufficient length to give the desired leverage, and of the right size to slide freely back and forth through the ring $E'$. G is a bread-kneading and butter-working knife, which has a hole cut through it near its upper edge, so that it can be slipped onto the rod F, and is provided with a thumb-screw, $f$, to secure the knife at any point on the rod, which screw, however, is preferably set against a metal plate attached to the rod. It may have a metal plate attached to its upper edge, through which the set-screw works. This knife G is made of wood, and has a straight back and a concave face, so that its lower edge, $g$, will be turned inwardly, as shown, Fig. 2, to catch under and lift up and roll over the dough or butter when drawn toward the same, and to form a broad bearing-surface, $g'$, to knead the dough or work the butter.

As shown in Figs. 1 and 2, the parts are in position to knead dough, the knife being secured at such a point on the rod that the rod will not pull out of the ring when the knife is at the farthest edge of the turn-table.

For butter-working, the butter can be placed directly upon the turn-table C; but I prefer to use a separate circular board, H, which may have a pivot bolt or pin, so that it can be put on the board A in place of the turn-table C; or the board H (the preferred way) can be placed directly on the turn-table C within the rim c'. The upper surface of the circular butter-working board H is raised at the center and slopes in every direction to a groove, h, around the edge of the board. The board is provided with a rim, $h^1$, so that the butter can be washed as well as worked thereon, and also has a short pipe, $h^2$, projecting through this rim from the bottom of the groove h, to carry off the milk and water. A proper plug is provided to close this pipe when working or washing the butter.

The board H being placed on the table C, butter can be worked upon it by the knife G, and when it is desired to pour off the milk collected in the groove h, the board H is turned so as to bring the spout $h^2$ opposite to the handle, and the device is tilted up to empty the milk into a dish.

For rolling out dough for biscuits, for mixing butter and lard with flour when dry to make pastry, and for cutting biscuits or printing butter, I use devices especially adapted for those purposes, but not new in themselves.

All three of these devices have holes, so that they can be slipped onto the rod F, and are provided with thumb set-screws to hold them at any point desired.

In some sections of the country it is customary to wash and work butter in a tray. My devices can be applied to a tray, Fig. 4, by securing the standard by a set-screw to one end of the tray. The working-knife G in that case would have its lower edge curved to fit the curved bottom of the tray.

What I claim as my invention is—

1. In a dough-kneader or butter-worker, the combination of the sliding round rod F, carrying the removable dough or butter working device, of the horizontally-pivoted ring E', through which the said rod slides, the vertically-pivoted yoke E, and the standard D, substantially as described and shown.

2. In a dough-kneader or butter-worker, the combination, with a pivoted circular board, of a double-swiveled ring supported by the base upon which the board turns, a rod sliding through said ring, and a dough or butter working device removably attached to said rod, substantially as described and shown.

3. In a dough-kneader or butter-worker, the circular base-board A, having the projecting strip B, to support the pivotal standard of the operating-rod, a turning board pivoted upon the base-board, and intermediate friction-rollers a, in combination with the sliding rod and the dough or butter working device removably attached to such rod, substantially as described and shown.

4. The combination, with the strip B and sides b, of the pivoted standard D, the brace d, and removable pin d', substantially as described and shown.

This specification signed and witnessed this 30th day of November, 1878.

HENRY A. RIDEOUT.

Witnesses:
  G. W. LORD,
  GEO. E. RIDEOUT.